United States Patent
Nakajima et al.

[11] Patent Number: 6,048,595
[45] Date of Patent: Apr. 11, 2000

[54] PRINTED ARTICILES HAVING LIGHT-STORING PRINTED LAYERS

[75] Inventors: Hiroyuki Nakajima, Saku; Kimio Tanaka, Komoro; Shuji Higashi; Tatsuo Fujii, both of Saku, all of Japan

[73] Assignee: TDK Corporation, Tokyo, Japan

[21] Appl. No.: 08/859,989

[22] Filed: May 21, 1997

[30] Foreign Application Priority Data

Sep. 18, 1996 [JP] Japan ................................. 8-266605
Feb. 5, 1997 [JP] Japan ................................. 9-035674

[51] Int. Cl.[7] .................................................. B32B 27/20
[52] U.S. Cl. .............................. 428/40.1; 40/542; 40/543; 242/344; 242/347; 360/132; 428/40.2; 428/41.6; 428/42.1; 428/203; 428/204; 428/207; 428/913
[58] Field of Search .................................. 428/40.1, 40.2, 428/41.6, 41.7, 41.8, 42.1, 203, 204, 207, 913; 250/484.4; 40/542, 543; 242/344, 347; 360/132

[56] References Cited

U.S. PATENT DOCUMENTS 5,698,301 12/1997 Yonetani ................................. 428/213
5,725,169 3/1998 Odagiri ................................... 242/344

FOREIGN PATENT DOCUMENTS

| 700046A2 | 3/1996 | European Pat. Off. . |
| 59-142981 | 9/1984 | Japan . |
| 62-80282 | 5/1987 | Japan . |
| 5-36229 | 2/1993 | Japan . |
| 8-230967 | 9/1996 | Japan . |

*Primary Examiner*—Nasser Ahmad
*Attorney, Agent, or Firm*—Wood, Phillips, VanSanten, Clark & Mortimer

[57] ABSTRACT

The present invention provides a superior light-storing printed article, which includes a light-storing printed layer comprising 50–80 wt % of light-storing pigment having $D_{50}=22-35$ μm and $D_{90}=58-80$ μm based on the total amount of the light-storing pigment and the binder, and the thickness of the printed layer being 50–150 μm.

15 Claims, 8 Drawing Sheets

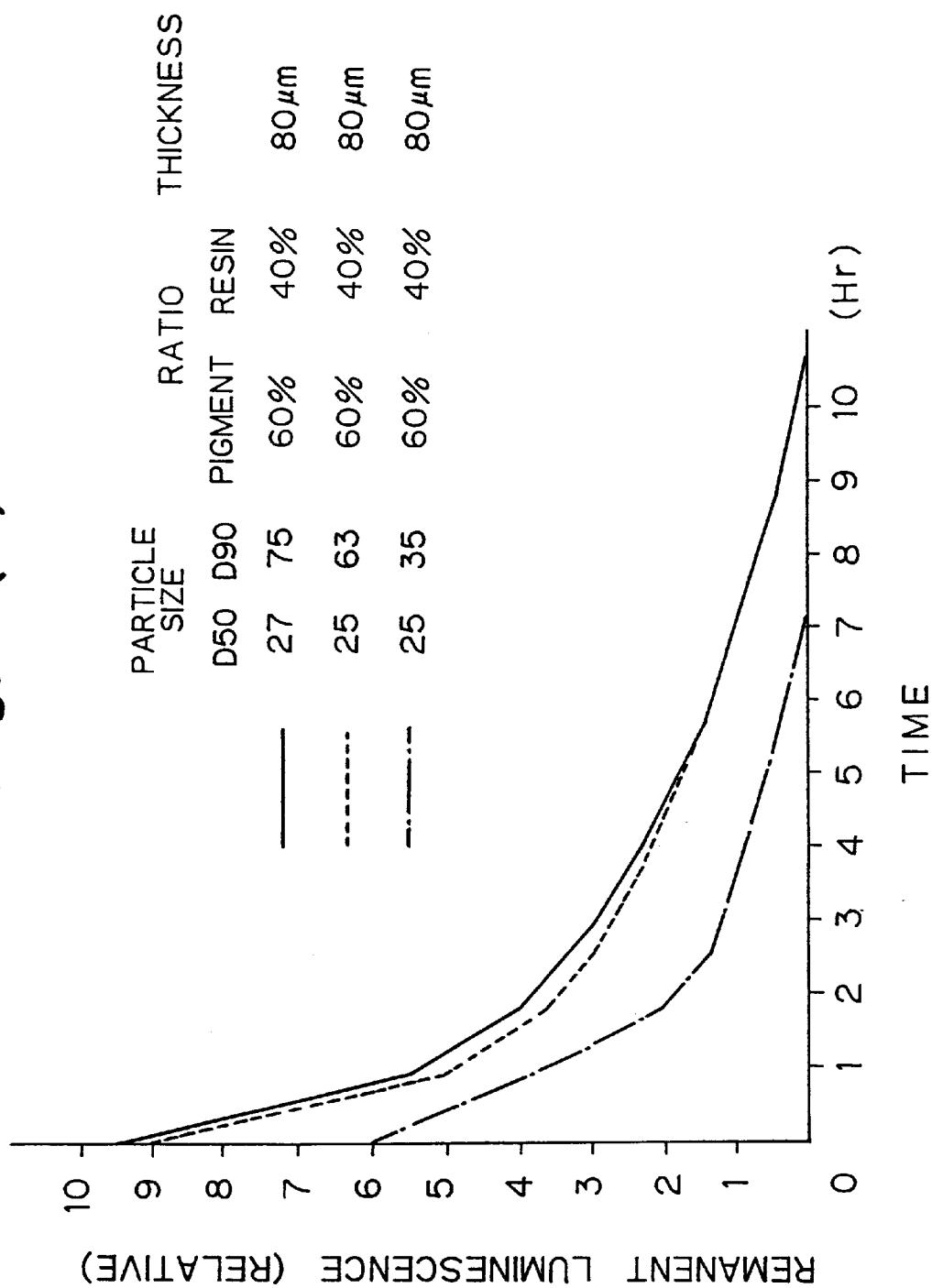

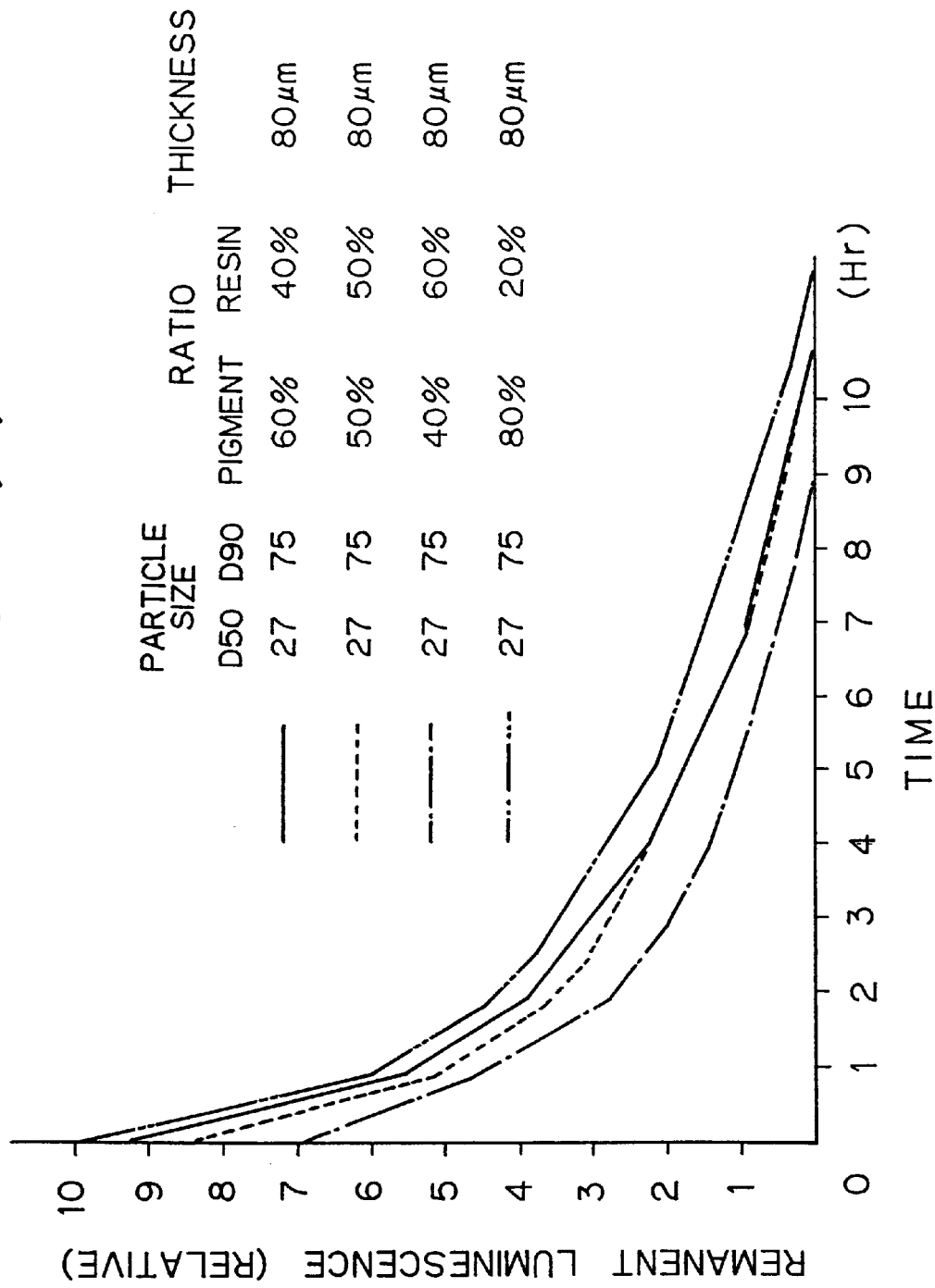

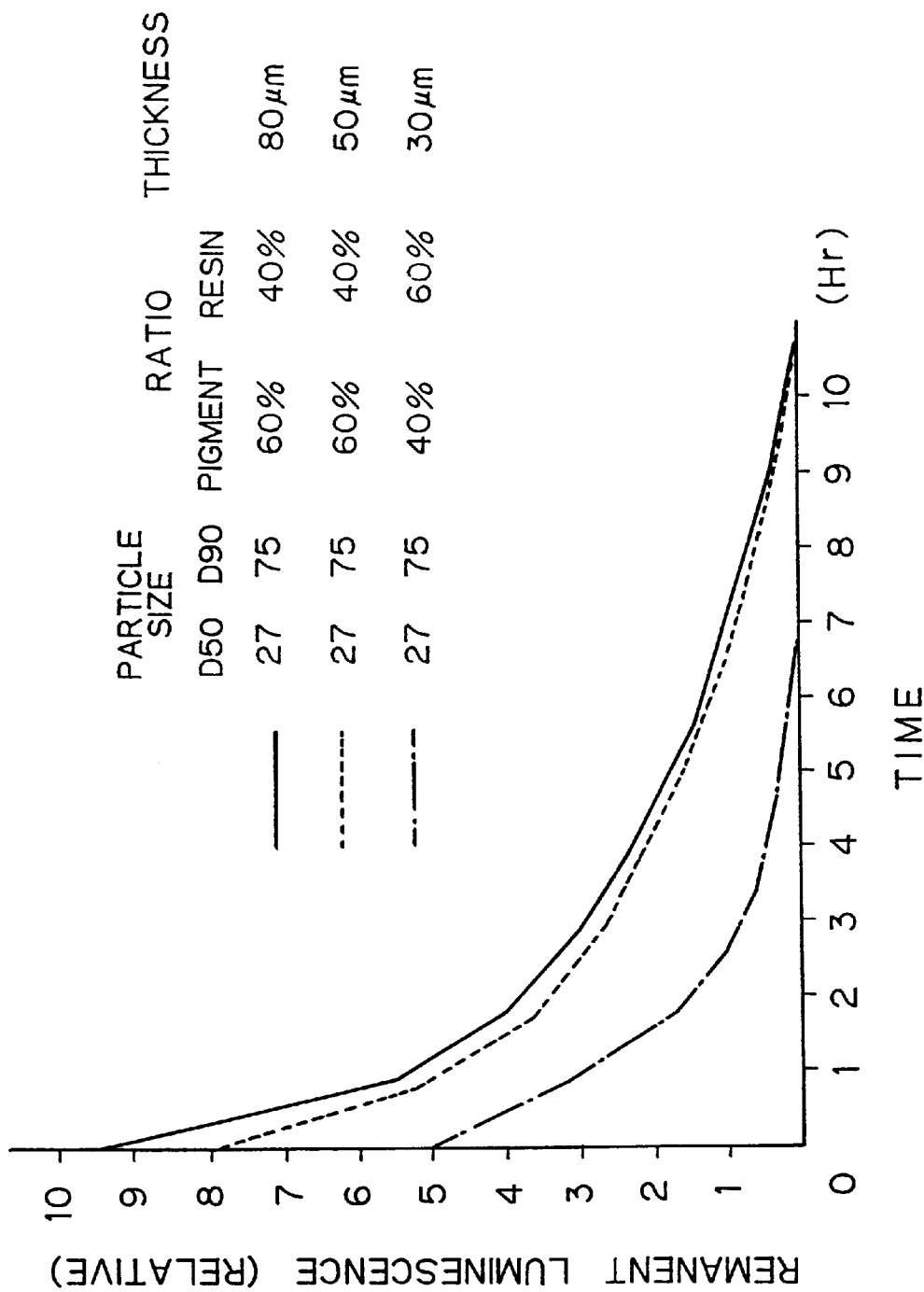

PRINTED ARTICLES HAVING LIGHT-STORING PRINTED LAYERS

BACKGROUND OF THE INVENTION

1. Technical Field of the Invention

This invention relates to printed articles having light-storing printed layers and label sheets having such light-storing printed layers for use in indicating information and the like on audio and video tape cassettes and other recording media such as MDs, MFDs, and CDs, or on cases of paper or plastics holding those media for storage. The invention also relates to articles provided with such light-storing printed layers.

2. Prior Art

Audio and video tape cassettes, MDs, and other disc cassettes are furnished with label sheets which the user can affix, after inscription of appropriate information or the like, to the casings or housings of the cassettes themselves or to the cases containing the cassettes. These housings and cases usually have receptive areas for labeling, each consisting of a recess to which a label can be attached. The user writes information on the label with a pencil, ballpoint pen, or other writing implement, and then sticks it on each cassette housing or each case for the housing, or vice versa. Each label has a blank space to be filled out with a subject of the contents, title of music, or other information, besides identification marks and other inscription that facilitate the user's choice according to the intended use.

FIG. 1 is a perspective view of a conventional audio tape cassette, showing a label 2 affixed to the cassette housing 1, with a blank surface 5 to be filled out. FIG. 5 is a cross sectional view indicating a typical structure of prior art label sheet 2. A writable label base 3 is lined with an adhesive layer 7, which in turn is protected on the opposite side with release paper 9. Before use, the release paper 9 is peeled off, and the label base 3 with the adhesive layer 7 is attached to the cassette housing 1 in the correct position.

The ink commonly used in printing writable label sheets is an offset or silk screen printing ink of ordinary composition for identification of sides A and B and for decorative designing of cassette housings 1. The ordinarily printed labels are identifiable and legible in the sunlight or illumination, but not in the dark. As an additional user-oriented feature, there is a growing demand for labels as useful at night, particularly in the dark, as in the light.

Some approaches have been made to meet the demand. One approach, as typically proposed by Japanese Utility Model Application Kokai No. 62-80282, uses a light-storing, phosphorescent paint in giving identification and indication directly to the both sides A and B of cassette housings so that the user can clearly differentiate between the two sides in a dark place.

Another approach, as according to Utility Model Application Kokai No. 59-142981, offers a label consisting of a label base, a self-emitting, luminous paint layer formed on the base surface, and a scratchable layer formed further on it by opaque printing.

Further, EP0700046A2 (Japanese Patent Application Kokai No. 8-77746) proposes to apply a light-storing printed layer having a light-storing property over about eight hours in which calcium carbonate or protein powder is mixed on a label sheet to be attached to a cassette, or directly on a cassette using a screen printing method, in order to impart both the light-storing property as well as the writing property to the light-storing layer on which letters or symbols may be directly written with a writing instrument like a pencil.

A few more techniques have been introduced to help distinguish letters and alphanumerical symbols on part of cassette housings, such as of magnetic tape cassettes, by printing them in white ink or light-storing ink.

For example, Japanese Patent Application Kokai No. 63-117383 came up with a liner sheet base containing a light-storing pigment so that the tape condition inside the cassette can be observed in the darkness.

Problems to be Solved

The use of phosphorescent paint in direct inscription as proposed by Utility Model Application Kokai No. 62-80282 does not allow the user to write necessary information on the cassette.

The label according to Utility Model Application Kokai No. 59-142981 that comprises a self-emitting, luminous paint layer formed on the base, and a scratchable layer formed further on the paint layer, has also drawbacks. The implement for scratch writing must have a hard point free of ink, something like a stylus; otherwise the scratched surface would be so stained that the luminous paint layer might become indiscernible. In addition, the scratch powder scatters, sometimes seriously marring the appearance and quality of inscription giving necessary information.

The attempt in EP0700046A2 to overcome these drawbacks is to provide a luminous or light-storing printed layer on the label base surface or on the cassette housing, and enable the user to write with a pencil or other writing implement directly on the printed layer surface. However, the luminous or light-storing pigment, which consists of a mass of hard and large inorganic particles, forms such a coarse label surface that the information written with a pencil is difficult to erase. Ballpoint pens and fountain pens are of little use on that surface because it repels ink. Felt-tip pens are useless either, since the tip is easily worn out by the abrasive action of the coarse pigment particles.

It is already in practice to form a light-storing layer on not only tape cassette housings but also on other articles by printing with an ink based on a light-storing pigment (i.e., a light-storing ink) and then print letters, figures, and patterns in black on the light-storing layer so that the letters and other inscriptions become visible under luminescent backgrounds at night or in a dark room. The most important of factors determining the success of arrangements is the remanent luminescence time of the light-storing layer. The light-storing paint is required to maintain a remanent luminescence period of at least 8 hours in which the letters, figures, and patterns are discernible. In respect of remanent luminescence, a rule of thumb has hitherto been that the thicker the light-storing layer the greater the remanent luminescence. It is true that both the intensity and duration of remanent luminescence increase in proportion with the thickness of the light-storing layer. However, a too thick layer requires copious use of the expensive light-storing pigment, adding to the cost accordingly. It is thus essential that desired light-storing performance be achieved with as thin a light-storing layer as possible.

Ordinary light-storing inks use a light-storing pigment mainly of coarse particles and contain an average of mere 20% or thereabouts of the pigment (on solids basis), and hence do not possess adequate light-storing properties.

Moreover, the luminous, light-storing pigments, each consisting of a mass of hard and large inorganic particles, provide label surfaces rough enough to mar the appearance. The information written on them with a pencil is difficult to erase. Ballpoint and fountain pens are difficult to use because the surfaces repel ink. Felt-tip pens have short life since their tips are rapidly worn out with abrasion by the coarse pigment particles.

The method of adding a light-storing pigment to the liner sheet base as taught by Patent Application Kokai No. 63-117383 is not practical. Since the light-storing pigment is dispersed throughout the resin that constitutes the base, its concentration is so low that the luminous intensity is limited and the remanent luminescence period that permits visual inspection of magnetic tape conditions is as short as about 30 minutes. Even the remanent luminescence makes it hardly possible for the user to read letters and other indications on the tape cassette housing. Moreover, because the light-storing pigment generally consists of coarse particles, a large addition reduces the lubricity characteristics of the liner sheet. The light-storing capacity cannot be increased, therefore, by an abundant use of the pigment; hence the light-emitting time that allows the inspection of tape conditions is limited to only about half an hour.

A further method proposed by EP0700046A2 consists in printing a light-storing ink layer on an appropriate portion of a tape cassette housing with an ink containing a light-storing pigment and making the printed layer surface writable so that the letters and symbols written on it can be read in the dark too. When the article so coated or printed, for example, a tape cassette housing, is transparent, the light disperses in all directions, and merely faint, if any, luminescence results. The limited light emission attracts but scant attention. A light-storing ink is translucent in itself (as the binder for the ink must be as clear as possible to secure ready exposure to light in order to enhance the light-storing performance). Consequently, a thicker coat of the ink extends the light-emitting time but does not increase the luminous intensity accordingly. When a liner sheet surface is printed with an ink containing a light-storing pigment, an excessively thick coat reduces the liner sheet functions. Thus the thickness must be restricted to 100 $\mu$m or less, which does not provide sufficient luminous intensity or duration (at least two hours of light-emitting time being essential) for the user to look for the tape cassette or make out letters or other inscriptions on it in the dark.

It is an object of this invention to provide label sheets which overcome the afore-described drawbacks of the prior art and permit the user to grasp the inscribed information exactly at night or in the dark, the label sheets being available at low cost and with excellent writability.

Another object of the invention is to provide light-storing printed articles having a light-storing layer having a remnant fluorescence for a long period of time which permits the users to read the characters or symbols inscribed thereon in a dark place or at night for a long period of time. Here, the printed articles include articles such as tape cassette, protective case for such cassette, on which a light-storing layer is directly printed, and label sheet having a printed light-storing layer thereon and is adapted to be attached to such articles.

A further object of the present invention is to provide a light-storing printed article, on which inscription is directly possible or on which is formed a writable layer which can be writted with a pencil, fountain pen, ball-point pen, aqueous felt pen.

A further object of the present invention is to provide a stronger luminescence with a longer period of time than the prior art so as to allow the users to find the cassettes in a dark place.

SUMMARY OF THE INVENTION

The present invention provides a superior light-storing printed article such as case for magnetic tape cassette or magnetic disc cartridge, shutter for magnetic disc cartridge, label sheet suitable to be attached to any of these articles, each of which has a light-storing layer.

More specifically, the present invention provides a printed article including an article and a light-storing printed layer on the front side of said article, said light-storing printed layer containing 50–80 wt % of light-storing pigment and a balance binder said pigment having D50=22–35 $\mu$m and D90=58–80 $\mu$m, and the thickness of t he printed layer being 50–150 $\mu$m.

Here, Dn (n=50 or 90) is defined as the maximum particle diameter of the particles amassed from the smallest diameter particles upward until they account for n %. According to the present invention, fine particles and coarse particles are appropriately mixed together to enhance the luminescent efficiency is enhanced by the coarse particles and is improved by the presence of the fine particles.

Further, according to the present invention, the printed article further includes a writable printed layer of a transparent or translucent material formed on the light-storing printed layer.

The above light-storing pigment is generally made of an inorganic material expressed by the general formula $MAl_2O_4$ where M is selected from Sr, Ca, and Ba) and preferably $(Eu, Dy)xSrAl_2O_4(x \leq 0.1)$.

According to the present invention, by appropriately selecting the particle sizes and the concentration of the light-storing pigments, and the thickness of the light-storing layer, it has been made possible to produce light-storing printed articles on which characters and symbols can be viewed with eyes in a dark place for a long period of time which were not possible with the conventional light-storing articles, and the luminescence strength as well as the remnant luminescence have been improved and the material cost is also suppressed.

One aspect of the present invention relates to a label sheet to be attached to tape casettes or the like, the label sheet having an adhesive layer and release paper on the rear side of a label sheet substrate which consists of a paper or film sheet and also having a light-storing layer printed with an ink containing a light-storing pigment on the front side of the substrate.

In this aspect, a printed writable layer printed with a transparent or translucent writable ink is formed on at least a part of the light-storing printed layer. This may be used alone or may be applied as a combination of two types of label sheets.

A further aspect of the invention relates to a light-storing printed article which includes a light reflective layer formed on an area of a cassette or an article capable of being seen from outside, and a light-storing layer containing a light-storing pigment printed on the reflective layer to increase the luminescence as well as its duration.

There is no particular restriction on the area on which the reflective layer and then the light-storing layer are formed but the area may be formed on the surface of a liner sheet of cassette which can be seen through, or directly on the outer surface of the cassette case. Alternatively, the reflective layer may be printed on a support film of a label sheet and then the light-storing layer is printed thereon and this label sheet is adhesively attached to a desired area on a cassette case.

In either case, a writable layer formed of a translucent or transparent film may be formed on the light-storing layer. When a light reflective layer and a light-storing layer are formed directly on a cassette case, the light-storing layer itself may be made writable or covered with a writable layer.

Label sheet may be similarly constructed so as to make it writable. When a liner sheet for cassette tape is provided with a reflective layer and light-storing layer thereon, a writable layer made of a transparent or translucent film may formed on an area of the cassette through which the light-storing layer is seen. Thus, the letters, figures or the like can be readable with the light from the light-storing layer.

BRIEF DESCRIPTION OF THE DRAWINGS

FIG. 6(a) is a graph showing the time dependence of light-storing properties of light-storing printed articles according to the present invention and a comparative example;

FIG. 6(b) is a graph showing the time dependence of light-storing properties of light-storing printed articles according to the present invention and a comparative example;

FIG. 6(c) is a graph showing the time dependence of light-storing properties of light-storing printed articles according to the present invention and a comparative example;

DETAILED DESCRIPTION OF THE INVENTION

Figure 1:
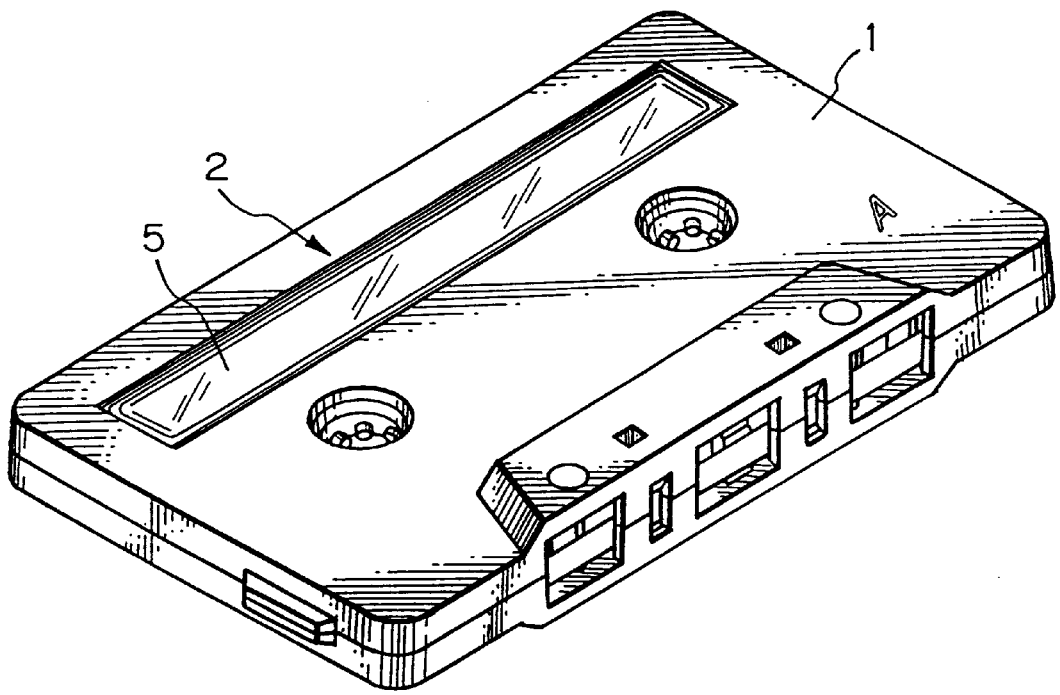
FIG. 1 is a perspective view of a tape cassette to which the present invention is applicable in common with the prior art.

The general belief is that the light-storing properties of a light-storing printed layer on a label, such as the remanent luminescence and time, are enhanced in proportion with the thickness of the light-storing printed layer or the coarseness of the light-storing pigment used. We have found that the light-storing properties are also largely dependent on the distribution of particle sizes in the light-storing pigment used. It has now been found that the control of the particle size distribution in the pigment to enable it to comprise coarse and fine particles in proper proportions leads to an increased content of the pigment in the light-storing ink and that it, in turn, improves the light-storing properties per unit thickness and thereby makes the light-storing printed layer thinner than heretofore.

With a light-storing ink, as noted above, the particle size of its light-storing pigment, the proportion of the pigment in the total amount (of solids) including the binder, and the thickness of the light-storing printed layer have material effects upon the remanent luminescence and its duration. Of these factors, the particle size distribution in the light-storing pigment is of particular importance.

Light-storing pigments mentioned already are generally used. In particular, the quality, safety, output, and other considerations make it preferable to use a product marketed by Nemoto Special Chemical Co. under the trade designation "N-Yako" (N-Luminescent paint). The product is a material represented by the formula $(Eu,Dy)xSrAl_2O_4$ in which x is 0.1 or less which is obtained by firing a rare earth element Eu and/or Dy together with high purity alumina and strontium carbonate at high temperature of the order of 1300° C. Detailed description is given in the specification of Patent Application Kokai No. 7-11250 for that company.

The smaller the particle size the better a light-storing pigment adheres to other materials. On the other hand, the smaller particles reduce the light-storing capacity and lessen the remanent luminescence and duration. This will be confirmed from FIG. 6 to be explained later and from experiments conducted in connection with the embodiment illustrated.

The proportion by weight of a light-storing pigment to the total amount of the pigment plus the binder will now be considered. A larger pigment content naturally makes the remanent luminescence stronger and the duration longer. When the pigment contains coarse particles, those particles are accompanied with fine particles that fill up the spaces among them, thereby increasing the proportion of the pigment. For this reason the light-storing pigment is desired to have a properly balanced, broad particle size distribution. Presence of too large particles impairs screen printability, however. A light-storing pigment with particle size not exceeding about 100 μm should be used. Since the pigment is used in mixture with a binder and solvent as an ink for printing to form a light-storing printed layer, its proportion in the range of 50 to 80% by weight is appropriate.

A thick light-storing printed layer is desirable because of increased remanent luminescence and duration, but a thicker layer adds to the cost. The layer cannot be too thin, on the other hand, because the thickness is dictated by the size of coarse particles contained in the light-storing pigment. The thickness of the printed layer usually ranges from 50 to 150 μm.

FIG. 6 indicates, as will be discussed later in Example 1, that the remanent luminescence and duration are improved by increasing the particle size and proportion of the light-storing pigment and thereby thickening the light-storing printed layer. This is because coarse and fine particles are properly mixed to increase the proportion of the pigment. This is presumably attributed to the combined effect of the presence of coarse particles and the increased proportion of the pigment owing to the intermixture of coarse and fine particles.

The particle size distribution of the light-storing pigment for use in the present invention is such that, when Dn is defined to be the diameters of the particles amassed from the smallest diameter particles upward until they account for n %, D50=22–35 μm and D90=58–80 μm. The maximum particle diameter is preferably about 100 μm.

Experiments in Example 1 and others show that it desirable that a light-storing pigment be contained in a proportion of 50 to 80% by weight to the total amount of the pigment plus the binder, and the thickness of the resulting printed layer is 50 to 150 μm. The reason for confining the thickness within that range has already been explained. The use of the conditions for particle size distribution as defined in the present invention brings a relatively smooth surface with improved outward appearance. Although the surface permits direct writing, it is more advisable to provide an additional clear layer for writing.

For the formation of a light-storing printed layer, the adoption of screen printing or transfer printing is desirable. Unlike other printing methods, screen printing applies the ink directly to an object to be printed. The screen is woven of fibrous lines of metal or resin, and the ink passes through the openings of the screen onto the surface to be printed. The method is termed also as stencil printing. A light-storing ink can be used in the screen printing. An important factor in the printing is the size of openings, or mesh. A range of 300 to 400 mesh (openings of 30–50 μm each) is common, but for the practice of the present invention, 120 mesh or less (openings of 160 μm or more each) is necessary because the maximum particle diameter of the light-storing pigment is about 100 μm The optimum mesh is 70 or less (openings of 290 μm or more). The reason is that a light-storing pigment with a particle size up to 100 μm has a tendency by nature toward aggregation of about three particles and, even if it occurs, the aggregates can pass through the openings when the mesh is 70 or less. In order to change the thickness of the printed layer, it is advisable to do so by adjusting the angle of and pressure on an ink-wiping implement known as squeegee. Screen printing comprises spreading ink on a printing plate with a doctor blade and applying a pressure on the plate by means of a squeegee. The ink is forced through the openings onto the surface to be printed, and therefore the squeegee angle and pressure governs the thickness of the resulting light-storing printed layer.

Figure 7:
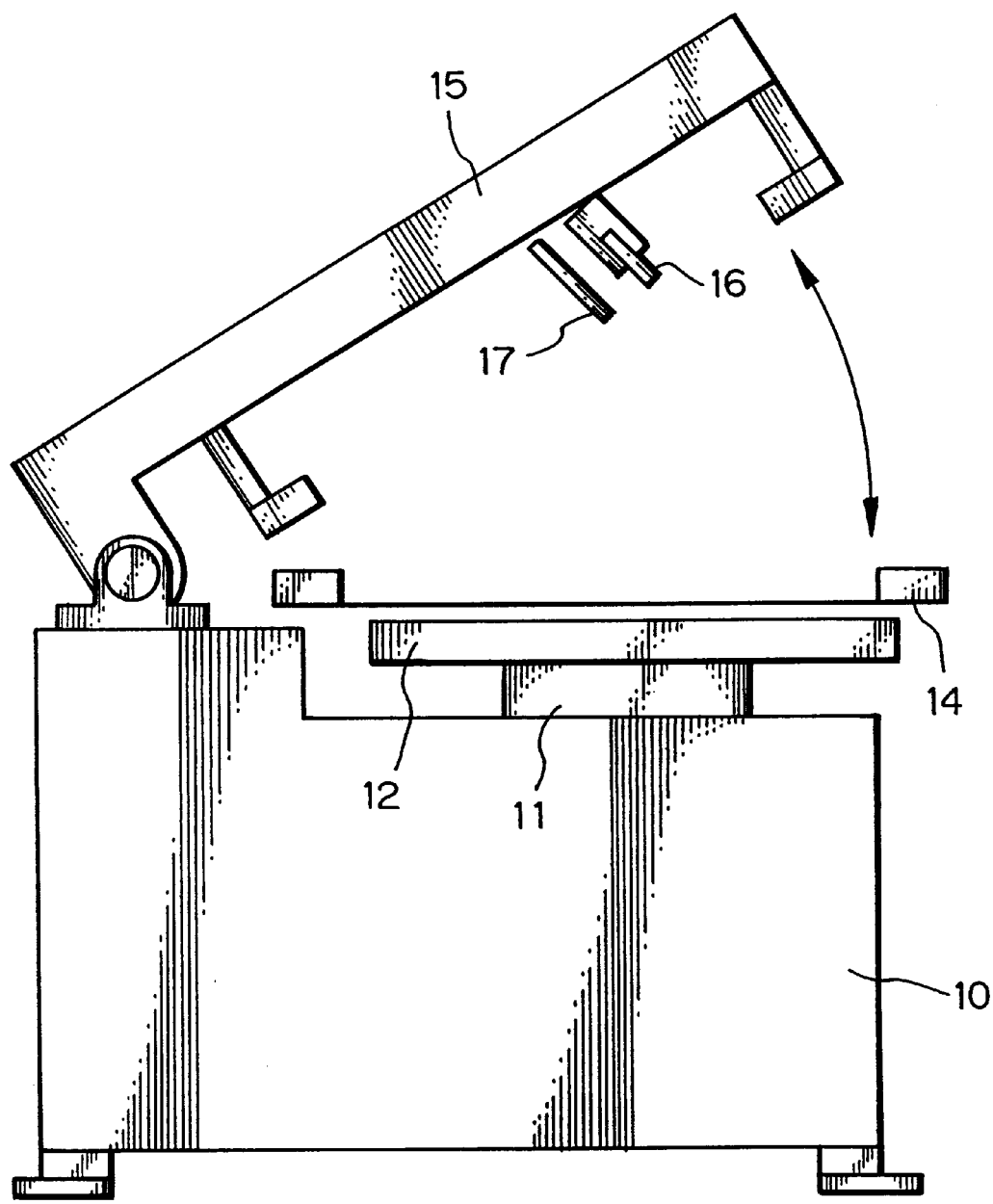
FIG. 7 is a schematic view of an apparatus for practicing the method of the invention.

The process will be explained below with reference to FIG. 7. There is shown a screen printing apparatus, with an article 12 to be printed placed on a table 11 mounted on a housing 10. A printing plate 14 carrying a screen 13 which has been subjected to image processing as desired is held above in parallel with the article to be printed. A tilted squeegee 16 is slidably supported by the underside of a cover 15 which, in turn, is pivotally supported at one end to be swung open. A proper amount of light-storing ink is put on the screen 13, the pivotally supported cover 15 is closed, a doctor blade 17 is moved to spread the ink over the entire surface of the screen, and then the squeegee is moved while applying a pressure to the plate for printing. The thickness of the light-storing printed layer can be controlled by adjusting the angle and pressure of the squeegee. The closer the angle to the vertical with respect to the surface to be printed the thinner the resulting layer, and the stronger the pressure the thicker the layer. An intended thickness can be obtained by properly adjusting the balance between these two conditions.

As for a binder for the light-storing pigment, a material chosen, for example, from among polyvinyl chloride-acetate, acrylic, urethane, and epoxy resins, in consideration of its compatibility with the material constituting the article to be printed, drying property, and other factors, is mixed with the pigment. The mixture is further mixed with other necessary additives and diluting solvent to prepare an ink. The ink is used in printing in a variety of ways. While a solvent type ink has been described, another type such as ultraviolet (UV) curing type is used as well.

The transparent or translucent, writable ink that is used in the printed writable layer may be an ink selected from among inks containing a binder and a protein powder and inks containing a binder and silica. Such an ink should be transparent or translucent and should produce a printed layer on which the user can write anything with a writing implement.

The printed writable layer thus produced is not limited to that for labels. On a prior art tape cassette shown in FIG. 1, for example, affixing a label onto a labeling region 2 may be replaced by direct screen printing to form a light-storing printed layer on the same region. As a further alternative, the printed layer may be formed on some other part of the cassette housing or elsewhere, for example, on the plastic shutter on the window of a floppy disc.

As the printed writable layer, a base (not shown) of a transparent or translucent film material which does not hamper the excitation of the pigment in the light-storing printed layer is laminated to the printed layer. At least the portion of the front side of the base to be made writable is roughened on the surface by corona treatment or the like to a surface roughness suited for writing, for example, about 5–30 μm and at most about 50 μm. If the surface is too smooth it is poorly writable, but if it is too rough the writing implement wears rapidly and the written information is difficult to erase. Alternatively, a transparent or translucent, writable ink, which is either an ink to which 5–20% of a protein powder binder has been added or an ink prepared by mixing an ink containing 5–20% of silica as a binder with a light-storing pigment for the remainder, is used in screen printing to form a light-storing printed layer.

EXAMPLE 1

Experiments were conducted to assess the effects of particle size distribution. "N-Yako" of the formula (Eu,Dy) xSrAl$_2$O$_4$ in which x is 0.1 or less was ground to such a size that the maximum particle diameter was approximately 100 μm. The ground product was classified to give a light-storing pigment having a sharply defined distribution of particles about 30 μm in size on the average (Comparative example). Also prepared are three specimens; pigments having a broad distribution of particles having maximum diameter of 100 μm (D50=30 μm, D90=63 μm), (D50=27 μm, D90=75 μm) and (D50=25 μm, D90=35 μm). Light-storing inks having compositions listed in Table 1 were prepared from these pigments. Solvent was a mixture of cyclohexanone, ketone, glycol ester and aromatic hydrocarbon. The inks were applied by screen printing to bases up to the thicknesses to make light-storing labels. The labels were irradiated with light of 500 1×for 15 minutes that was necessary for saturation, and the relations between their data of remanent luminescence and time were found. The results are shown in Table 1 and FIGS. 8(a), 8(b) and 8(c). Throughout the experiments a combination of acrylic resin and polyvinyl chloride-acetate was used as a binder.

TABLE 1

| Sample | Comp 1 | Examples 2 | Examples 3 | Comp 4 | Examples 5 | Examples 6 | Examples 7 | Comp 8 |
|---|---|---|---|---|---|---|---|---|
| Size μ | | | | | | | | |
| D50 | 25 | 25 | 27 | 27 | 27 | 27 | 27 | 27 |
| D90 | 35 | 63 | 75 | 75 | 75 | 75 | 75 | 75 |
| Content wt % | 60 | 60 | 60 | 40 | 50 | 80 | 60 | 60 |
| Thickness μ | 80 | 80 | 80 | 80 | 80 | 80 | 50 | 30 |
| Remanent luminescence hr | | | | | | | | |
| 0 | 6 | 9 | 9.5 | 7 | 8.5 | 10 | 8 | 5 |
| 1 | 4 | 5 | 5.5 | 4.5 | 5 | 6 | 5 | 3 |
| 2 | 2 | 3.5 | 4 | 2.5 | 3.5 | 4.5 | 3.5 | 1.5 |
| 4 | 1 | 2.5 | 2.5 | 1.5 | 2.5 | 3 | 2.5 | 0.5 |
| 8 | 0 | 1 | 1 | 0.5 | 1 | 1.5 | 1 | 0 |

*Comp = Comparative example

Looking at FIG. 6(a), it is noted that the mixture of various particle sizes produces a light-storing printed layer having larger remanent luminescence and longer light-storing time.

Looking at FIG. 6(b), it is noted that the larger the proportion (by weight) of the light-storing pigment, the larger is the remanent luminescence and the longer is the light-storing time of the light-storing printed layer.

Looking at FIG. 6(c), it noted that the thicker the light-storing printed layer, the larger is the remanent luminescence and the longer is the light-storing time of the light-storing printed layer.

Consequently, it is concluded that a larger particle size of pigment, larger contents of pigment and thicker printed layer contribute to larger remanent luminescence and longer light-storing time. The larger contents of pigment is materialized by an appropriate concentration of smaller particles interposed between larger particles. Thus, it is considered that the effect of coarse particles of the light-storing pigments is combined with the effect resulting from the coarse particles intermixed with fine particles.

As a conclusion, the present invention provides a superior light-storing printed article, which includes a light-storing printed layer comprising 50–80 wt % of light-storing pigment having D50=22–35 μm and D90=58–80 μm based on the total amount of the light-storing pigment and the binder, and the thickness of the printed layer being 50–150 μm.

EXAMPLE 2

Using the sample 3 in Example 1, a transparent top coat having a silica-binder mixture shown in Table 2 was applied on the surface of the light-storing printed layer. The writing ability of the top coat with various writing instruments, weather test, ink adhesion strength and surface roughness Ra were measured. The results are shown in Table 2.

TABLE 2

| Light-storing ink | Particle size | D50 = 27 μm | D50 = 27 μm |
|---|---|---|---|
| | | D90 = 75 μm | D90 = 75 μm |
| | Concentration | 60 wt % | 60 wt % |
| | Thickness | 80 μm | 80 μm |
| Top coat | Binder | 90 wt % | none |
| | Silica | 10 wt % | none |
| Writability | Pencil | acceptable | bad |
| | Ball-point pen | good | poor |
| | Aqueous pen | good | poor |
| | Oil pen | acceptable | acceptable |
| Weather test | 70° C. | slight change | changed |
| | Cycle | slight change | changed |
| | Ambient temp. | no change | slight change |
| Ink adhesion | | good | acceptable |
| Surface Ra | | 19.1 μm | 38.5 μm |

In the light-storing printed layer according to the present invention, as described above, fine and coarse particles are mixed in proper proportions so that the coarse particles can bring an increased light emission efficiency and the fine particles further enhance it. In even more desirable embodiments the writability of the light-storing printed layers improved by printing at least a part of the layer surface with a transparent or translucent, writable ink. Moreover, the resulting layer has a smooth, good-looking surface which is suited for writing.

Once proper particle size and proportion of a light-storing pigment and proper thickness of a light-storing printed layer are chosen in conformity with the present invention, it is possible to manufacture light-storing printed articles with letters, figures, and patterns on the printed layer legible during longer light-emitting time than heretofore. Both remanent luminescence and duration are increased while the material cost of the light-storing pigment is kept relatively low.

The following are examples of the light-storing printed layer according to the present invention. They are those applied to label sheets.

More specifically, one aspect relates to a label sheet having an adhesive layer and release paper on the rear side of a label sheet substrate which consists of a paper or film sheet and also having a light-storing layer printed with an ink containing a light-storing pigment on the front side of the substrate, a printed writable layer printed with a transparent or translucent writable ink is formed on at least a part of the light-storing printed layer.

Another aspect is a label sheet having a light-storing printed layer printed with an ink containing a light-storing pigment on a label sheet substrate which consists of a transparent or translucent film sheet and also having an adhesive layer and release paper on the rear side of the substrate, the light-storing printed layer is provided on the rear side of the label sheet substrate, the adhesive layer is so provided as to cover at least a part of the light-storing printed layer, and a printed writable layer printed with a transparent or translucent writable ink is formed on at least a part of the front side of the label substrate.

A yet further aspect is a label sheet having an adhesive layer and release paper on the rear side of a label sheet substrate which consists of a paper or film sheet and also having a light-storing layer printed with an ink containing a light-storing pigment on the front side of the substrate, a transparent or translucent film is laminated to the light-storing printed layer to cover at least a part thereof and a roughened writable layer is formed on the film surface.

Another aspect is a label to be affixed to a case or other object sheet having an adhesive layer and release paper on the rear side of a label sheet substrate which consists of a paper or film sheet and also having a light-storing layer printed with an ink containing a light-storing pigment on the front side of the substrate, the light-storing printed layer is printed with an ink mixed with a powder pigment which is transparent or translucent and is writable. The ink may be a protein powder dispersed in a binder, or silica dispersed in a binder. These inks must be transparent and writable with writing instruments.

The foregoing described single labels but a composite of first and second label sheets is also possible. According to this aspect, a first label sheet having an adhesive layer and release paper on the rear side of a label sheet substrate which consists of a paper or film sheet and also having a light-storing layer printed with an ink containing a light-storing pigment on the front side of the substrate, and a second label sheet having a transparent or translucent film sheet substrate and an adhesive layer on the surface of the substrate facing the light-storing layer of the first label sheet, the film sheet substrate having a writable layer printed with a transparent or translucent writable ink. In use, the first and second label sheets are bonded together. With this aspect, the second label sheet can be removed and exchanged to a new second label sheet while leaving the first layer as it is.

The printed writable layer may be replaced by a transparent or translucent sheet having a front surface roughened to a degree to allow writing.

EXAMPLE 3

Figure 2:
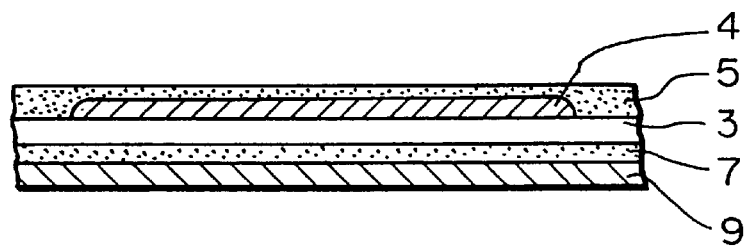
FIG. 2 is a cross sectional view of a first embodiment of the invention.

Referring to FIG. 2, a label sheet is shown as made by first printing the front side of a base 3 of paper or thin film material with indications for identification, writable area, and the like by offset or screen printing, and then a light-storing printed layer 4 is formed on it with the above-mentioned light-storing ink by screen printing. A printed writable layer 5 is formed by screen printing, using a transparent or translucent, writable ink which does not hamper the excitation of the pigment in the light-storing printed layer, on at least a part of the front side of the light-storing printed layer 4 which should be rendered writable.

On the rear side of the base 3 is formed an adhesive layer 7, and a sheet of release paper 9 is attached to the layer. When the label sheet is not in use, the release paper 9 is weakly affixed to cover the entire surface of the adhesive layer 7.

EXAMPLE 4

Figure 3:
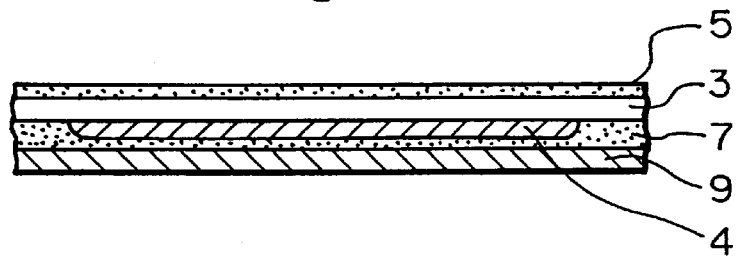
FIG. 3 is a cross sectional view of a second embodiment of the invention.

Looking at FIG. 3, there is shown a label sheet whose base 3 is formed of a transparent or translucent film material which does not interfere with the passage of light. The rear side of the base 3 is lined with a light-storing printed layer 4 by screen printing with the light-storing ink. Further, an adhesive layer 7 for affixing to an area to be labeled is formed on the light-storing printed layer 4 to cover at least a part of it. A sheet of release paper 9 is weakly attached to the adhesive layer 7 to cover its entire surface while the sheet is not in use.

The base 3 of film material on which the light-storing printed layer 4 and adhesive layer 7 have been formed is die cut to slips of given dimensions, backed with the weakly attached release paper 9. Each die cut slip, or label, is peeled away from the release paper 9 and glued to a cassette case housing or the like. Further, a transparent or translucent, printed writable layer 5 which does not obstruct the excitation of the pigment in the light-storing printed layer 4 is formed by screen printing on at least the portion of the front side of the base 3 of transparent film material that should be made writable.

While single label sheets embodying the invention have thus far been described, the invention may also be embodied in combinations of two label sheets as follows.

EXAMPLE 5

Figure 4:
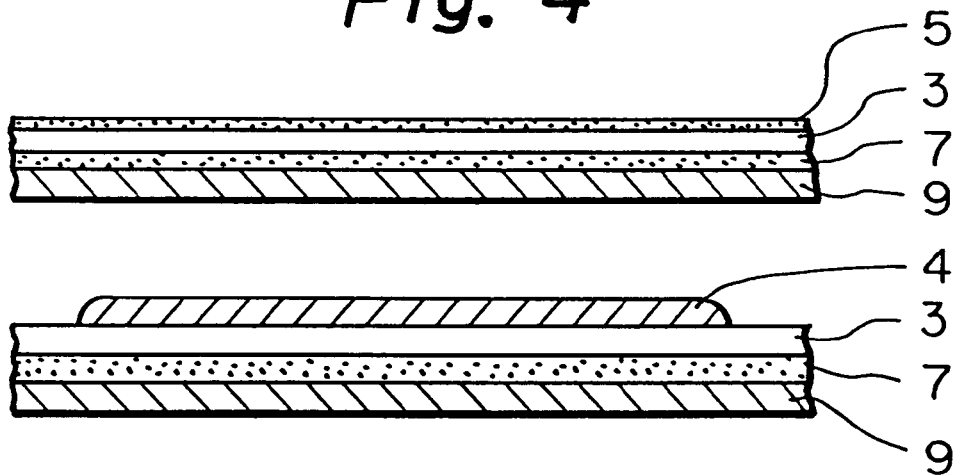
FIG. 4 is a cross sectional view of a third embodiment of the invention.
Figure 5:
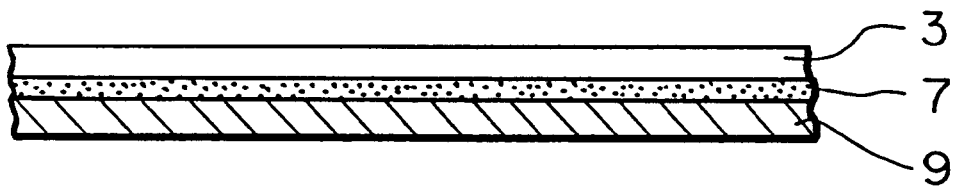
FIG. 5 is a cross sectional view of a label of the prior art.

Referring now to FIG. 4, a first label sheet is made by printing a base 3 of paper or thin film material with identifiable indications, writable area, etc. on its front surface by offset or screen printing, and a light-storing printed layer 4 is formed on it by screen printing using the above-mentioned light-storing ink. An adhesive layer 7 and release paper 9 are provided on the rear side. A second label sheet consists of a base 3 of transparent or translucent film material formed on the rear side with an adhesive layer 7 of thin, transparent or translucent film material for adhesion to the side of the first label sheet where there is the light-storing printed layer 4, and release paper 9 for temporarily protecting the adhesive layer. On the opposite or front side of the second sheet is formed a printed writable layer 5 of transparent or translucent ink which makes the layer writable. The user writes information on the second label, peels the release paper from its back side, sticks the label to the front side of the first label, and then affixes the combined label to a cassette housing or its case or the like. If the second label is put on the first, the laminate will function as a light-storing label. This combination is not only easy to handle but permits effective use of the valuable light-storing substance through replacement of the second label on the same first label.

Although the present invention has been described as embodied in label sheets for use on tape cassette housings and on cases for containing the cassettes, it is applicable to other uses as well.

The label sheets made by the means described above permit the user to write easily whatever information needed on the light-storing printed layer, directly or indirectly, with a free choice of writing implements. The labels on tape cassette housings and cassette cases are extraordinarily advantageous in that they render it possible for the user to identify the needed information exactly at night or in the dark.

EMBODIMENTS HAVING REFLECTIVE LAYER AND LIGHT-STORING LAYER

Figure 8:
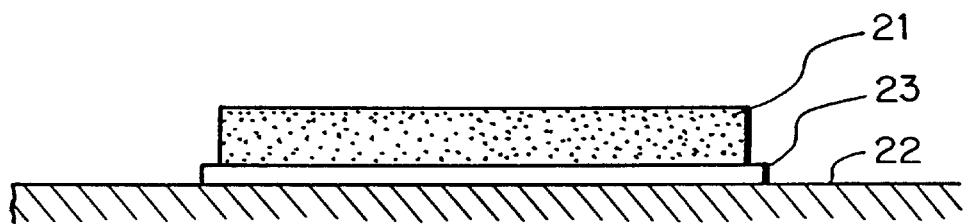
FIG. 8 is a cross sectional view of the structure of a basic embodiment of the invention using a reflective layer.

In FIG. 8, which is a cross sectional view of a basic structure common to all other embodiments of the invention to be described below, the numeral 22 designates a substrate typified by a specific region of a liner sheet, base film, or cassette housing. The substrate is a base film in the embodiment to be described in connection with FIG. 9, and a liner sheet in the embodiment of FIGS. 10–11.

A reflective layer 23 is formed on the surface of the substrate 22. It consists of a metallic reflective layer such as a metallic vapor deposited film or a layer printed with a silver-colored ink containing flaky aluminum particles. Alternatively, it is a reflective layer formed by printing with a white ink containing titanium white, calcium carbonate powder or the like, or some other highly reflective layer.

Over the reflective layer 23 is formed a light-storing ink layer 21.

For example, a white ink is applied to the surface of a clear substrate 22 to form a layer which is 3 $\mu$m thick when dry, and then a light-storing ink is applied onto the white ink layer to a dry thickness of 50 $\mu$m.

In the case of a liner sheet, the substrate coated up to this stage is used as it is. For a label to be affixed or when a label surface is formed by direct printing, a writable layer 24 as will be explained later in conjunction with FIG. 10 may be formed on the light-storing ink layer. Such a writable layer is formed from a transparent resin binder mixed with protein, starch, or wood cellulose powder. Wood cellulose powder is obtained, for example, by removing oil and fat from wood, cotton, hemp or other fiber, boiling the fiber with a dilute alkali solution, drying, and powdering for ease of inking. Wood cellulose, free of oil or fat, is excellently hygroscopic (hydrophilic) and provides a highly receptive surface for writing. More concrete embodiments of the invention will be described below.

Figure 9:
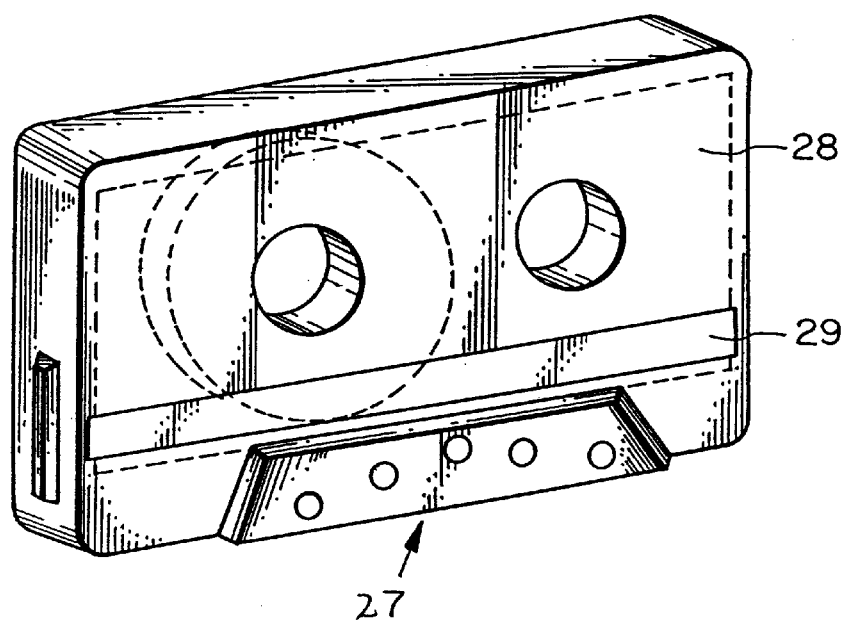
FIG. 9 is a perspective view of an embodiment of the tape cassette incorporating a reflective layer in accordance with the invention.

FIG. 9 illustrates a tape cassette 27 in which the invention is embodied. The invention is applicable to a liner sheet 28 in a cassette housing having a transparent housing half through which the liner sheet is visible from the outside. With a tape cassette having a translucent or opaque housing half, the invention is applicable to its region to be labeled

EXAMPLE 6

Figure 10:
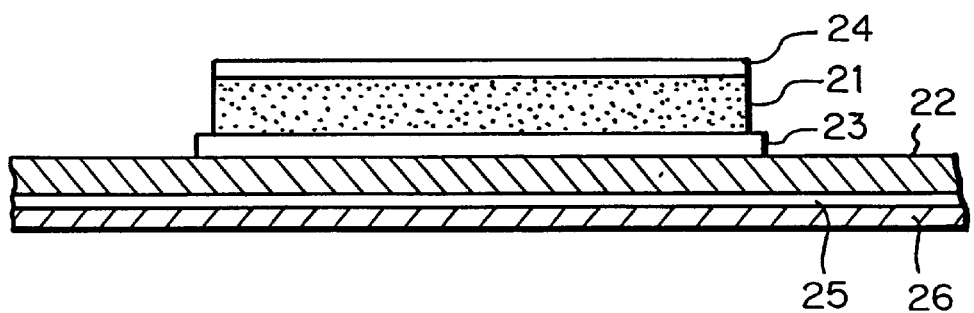
FIG. 10 is a cross sectional view of a light-storing label embodying the invention as using a reflective layer.

FIG. 10 illustrates an example of label to be affixed to the labeling region 29. As shown, the label is made by forming a reflective layer 23 and a light-storing ink layer 21 formed on the front side of a tape-like substrate 22 of PET or the like, and a release paper 26 attached through an adhesive layer 25 to the back side of the substrate 22. When writability must be imparted, a writable layer 24 is formed over the light-storing ink layer 21. The structures of the individual layers are the same as already described. Before use, the label sheet is cut to a predetermined label size, the release paper 26 is peeled away, and the back side of the substrate 22 is affixed with the aid of the adhesive layer 25 to the labeling position 29 of the cassette shown in FIG. 9.

EXAMPLE 7

Figure 11:
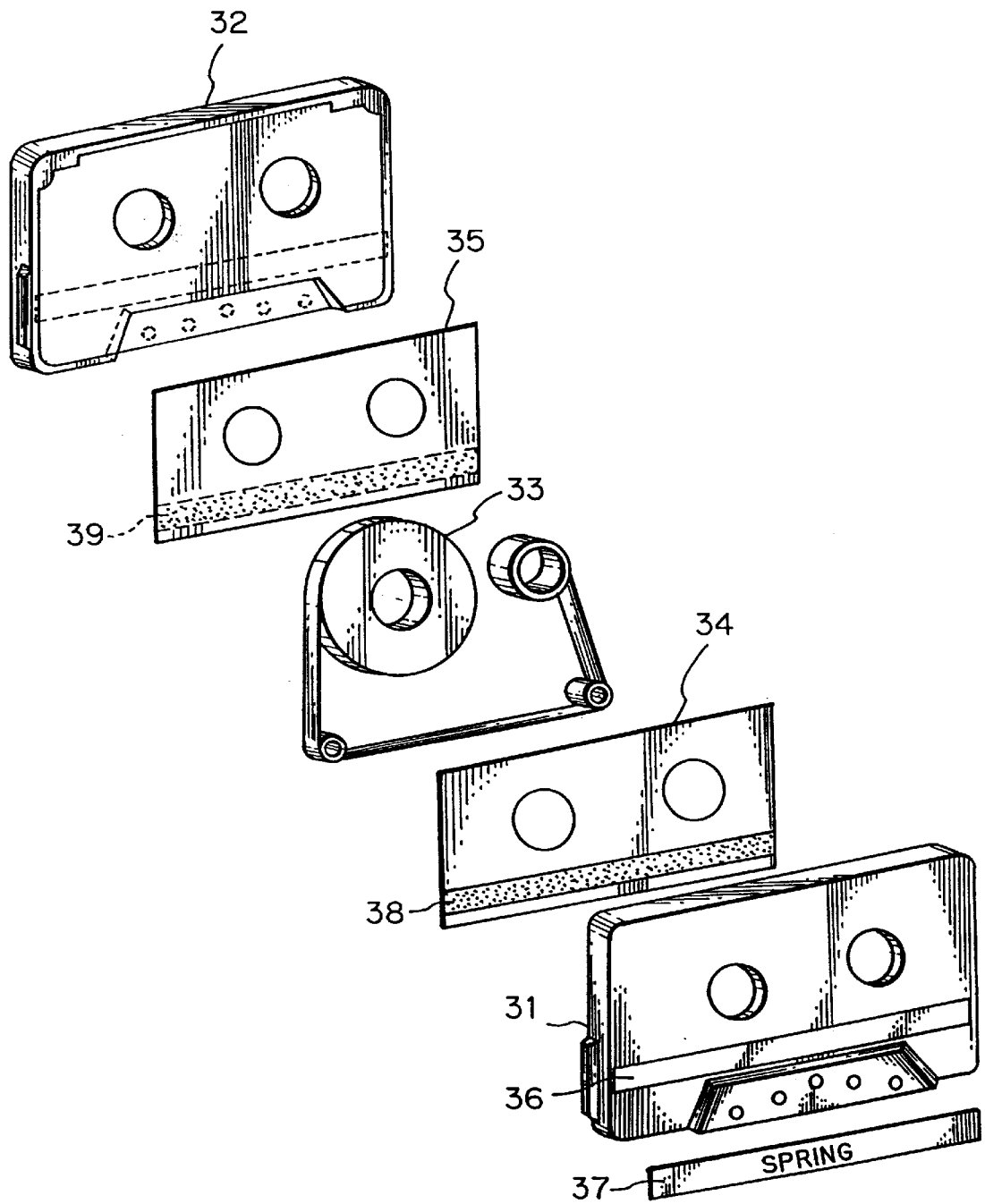
FIG. 11 is an exploded view of another embodiment of the tape cassette of the invention using a reflective layer.

There is shown in FIG. 11 an embodiment in which the invention is applied to a liner sheet. Clear housing halves of a tape cassette, a half 32 forming the side A and a half 32 forming the side B, are mated together along their edges, containing a length of magnetic tape 33 inside. A side A liner sheet 34 and a side B liner sheet 35 are held, respectively, in the spaces between the magnetic tape 33 and the housing halves 31, 32 on the sides A, B. Each of the liner sheets 34, 35 which are transparent is imparted with lubricity by silicone treatment on the side to contact one tape edge but is not so treated on the opposite side.

The liner sheets 34, 35 have, respectively, light-storing laminates 38, 39 of the structure shown in FIG. 8, each consisting of a reflective layer 23 and a light-storing ink layer 21, formed in specific positions on the outer side (facing the inner walls of the housing halves 31, 32 ). Preferably, in positions on the outer walls of the halves superposing the light-storing laminates 38, 39, there are attached transparent labels 37, one for each. Each transparent label 37 may be affixed, with the writable layer as described above formed on its top. Alternatively, it may be directly printed with a writable layer. Information such as titles of music may be written on the transparent label 37.

When the cassette labeled in this way is used, the light, for example, from the light-storing laminate 38 is reflected on the back side by the reflective layer 23 and is mostly released toward the outside. For this reason the luminous intensity in the dark is nearly twice that of the laminate without a reflective layer and prolonged light emission is made possible. This not only facilitates the identification of the cassette in the dark but also enables the user to read letters on the label 37 for an extended period of time without external light.

In comparative experiments, a white ink for silk screen made by Teikoku Ink Co. was applied as a white pigment to a liner sheet to form a reflective layer about 3 $\mu$m thick when dry. As a light-storing ink, "N-Yako" of Nemoto Chemical was applied on the reflective layer to a dry thickness of about 50 $\mu$m. Meanwhile a transparent label 37 of wood cellulose powder having a particle size of about 5 $\mu$m and formed to a layer with epoxy acrylate and acrylic resin combinedly used as a binder was attached to the labeling position 36 on the outer wall surface of a cassette half. When allowed to stand under a fluorescent lamp for 30 minutes, a label 37 not provided with the reflective layer emitted light sufficient for reading letters on the label for about 15 minutes, whereas the adequate light-emitting time of a label having the reflective layer was about 2 hours. The duration for which the light-storing ink layer could simply be identified was about one hour for the non-reflective label, whereas the presence of the reflective layer extended the duration to as long as about 6 hours.

Thus, according to the invention, a reflective layer provided behind a light-storing ink layer improves the luminous intensity and light-emitting time of the light-storing ink layer, substantially prolonging the time during which the ink layer and written letters and symbols are identifiable and legible.

While preferred embodiments have been described, it will be obvious to those skilled in the art that changes and variations may be made without departing from the spirit or scope of the invention as hereinafter claimed.

What we claimed is:

1. A printed article including an article and a light-storing printed layer on the front side of said article, said light-storing printed layer containing 50–80 wt % of light-storing pigment and a balance binder, said pigment having D50= 22–35 $\mu$m and D90=58–80 $\mu$m, and the thickness of the printed layer being 50–150 $\mu$m.

2. A printed article including an article and a light-storing printed layer on the front side of said article according to claim 1, wherein said printed article further includes a writable printed layer of a transparent or translucent material which provides a receptive surface for writing, formed on the light-storing printed layer.

3. A printed article including an article and a light-storing printed layer on the front side of said article according to claim 1, wherein said printed article further includes a light reflective layer on the rear side of the light-storing printed layer.

4. A printed article including an article and a light-storing printed article on the front side of said article according to claim 2, wherein said printed article further includes a light reflective layer on the rear side of the light-storing printed article.

5. A printed article including an article and a light-storing printed layer on the article according to claim 2, or 4, wherein said printed article is a label sheet to be affixed to an object, said label sheet having an adhesive layer and release paper on the rear side of a label sheet substrate and also having said light-storing printed layer formed closer to the front side of the substrate than the adhesive layer, the writable printed layer is formed closer to the front side than the light-storing printed layer, said writable printed layer enabling the user to see at least a part of said light-storing printed layer through said writable printed layer.

6. A printed article including an article and a light-storing printed article on the article according to claim 2, or 4, wherein said printed article is a label sheet having an adhesive layer and release paper on the rear side of said label sheet substrate which consists of a paper or film sheet and also having said light-storing layer on the front side of the substrate, said writable printed layer printed with a transparent or translucent writable ink formed on at least a part of the light-storing printed layer.

7. A printed article including an article and a light-storing printed article on the article according to claim 2, or 4, wherein said printed article is a label sheet having said light-storing printed layer on a label sheet substrate which consists of a transparent or translucent film sheet and also having an adhesive layer and release paper on the rear side of the substrate, the light-storing printed layer is provided on the rear side of the label sheet substrate, the adhesive layer is so provided as to cover at least a part of the light-storing printed layer, and a writable printed layer printed with a transparent or translucent writable ink is formed on at least a part of the front side of the label substrate.

8. A printed article including an article and a light-storing printed article on the article according to claim 2, or 4, wherein said writable printed layer is a printed layer from an ink containing a binder and one of the powders of the group consisting of protein, silica and wooden cellulose powders.

9. A printed article according to claim 1 including an article and a light-storing printed article on the article, wherein said article comprises a first label sheet and a second label sheet in combination, said first label sheet consisting of a label sheet substrate which consists of a paper or film sheet, said light-storing layer printed on the front side of the substrate, an adhesive layer on the rear side of said substrate and a release sheet formed on the rear side of the adhesive layer, said second label sheet consisting of a transparent or translucent film sheet substrate, a printed writable layer printed on the front side of said film sheet substrate with an ink which permits writing, and an adhesive layer on the rear side of said film sheet substrate which is attached to the surface of said light-storing layer.

10. A printed article including an article and a light-storing printed article on the article according to claim 3, wherein said article is a tape cassette, said light reflective layer is formed on an area of said cassette which can be seen from outside, and said light-storing printed layer is formed on said light reflective layer.

11. A printed article according to claim 10, wherein a writable printed layer is formed on said light-storing printed layer.

12. A printed article according to claim 10, wherein said article is a tape cassette comprising a case and a liner sheet within said case inserted between a wound tape and and an inner wall of said case, said reflective layer is formed on the liner sheet in an area which can be seen through a transparent portion of said case, and said light-storing printed layer is formed on said reflective layer.

13. A printed article according to claim 10, wherein said area which can be seen from outside is in an area on the outer surface of said cassette, and said light reflective layer and said light-storing layer are formed directly on said area.

14. A printed article according to claim 10, wherein said area which can be seen from outside is in an area on the outer surface of said cassette, and said light reflective layer and said light-storing layer are formed on said area, said reflective layer being provided with an adhesive layer on the rear side on a release sheet which has been peeled.

15. A printed article according to claim 12, wherein a writable label which is transparent or translucent is attached to a portion of said case through which said light-storing layer can be seen.

* * * * *